United States Patent
Chessell et al.

(10) Patent No.: US 8,104,018 B2
(45) Date of Patent: Jan. 24, 2012

(54) CONFIGURING A SOFTWARE PRODUCT

(75) Inventors: Amanda Elizabeth Chessell, Alton (GB); John William Sweitzer, Austin, TX (US); Kamorudeen Larry Yusuf, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1125 days.

(21) Appl. No.: 11/924,004

(22) Filed: Oct. 25, 2007

(65) Prior Publication Data
US 2009/0125896 A1 May 14, 2009

(30) Foreign Application Priority Data

Oct. 26, 2006 (GB) .................................. 0621300.3

(51) Int. Cl.
*G06F 9/44* (2006.01)
(52) U.S. Cl. ....................................................... 717/121
(58) Field of Classification Search .................... 717/121
See application file for complete search history.

(56) References Cited

U.S. PATENT DOCUMENTS

| 7,409,463 B2* | 8/2008 | Ramachandran ............. 709/246 |
| 2005/0125509 A1* | 6/2005 | Ramachandran ............. 709/220 |
| 2005/0248806 A1* | 11/2005 | Klein et al. .................. 358/1.15 |
| 2005/0257136 A1* | 11/2005 | Charisius et al. ............. 715/511 |
| 2006/0288023 A1* | 12/2006 | Szabo .......................... 707/100 |
| 2007/0179833 A1* | 8/2007 | Moorthy et al. ................ 705/10 |

* cited by examiner

*Primary Examiner* — Philip Wang
(74) *Attorney, Agent, or Firm* — Matthew C. Zehrer

(57) ABSTRACT

A method of configuring a software product comprises accessing a user model, the user model defining one or more user roles and one or more tasks, each task linked to a role, accessing a task to software function map, the map defining one or more software functions of the software product and one or more tasks, each software function linked to a task, and configuring the software product so that access to the software product according to a specific user role is via a user interface supporting the software functions linked to the specific role via the tasks.

12 Claims, 5 Drawing Sheets

CONFIGURING A SOFTWARE PRODUCT

FIELD OF THE INVENTION

This invention relates to a method of configuring a software product, and to the software product itself.

BACKGROUND

Software products are continually increasing in complexity. A major problem in the software services industry is that there is a default position which is that a customer of a software product must adapt their organization and staff to the product rather than adapting the product to their organization.

All organizations find it necessary to restructure the way that they are organised and the roles that people perform. This can be due to changes in personnel, or to address a new opportunity or threat, or to create new dynamics in the organization, for example. Existing software systems often make organizational change difficult because people become statically tied to their roles through the software tools they use.

SUMMARY

According to an embodiment of the present invention, there is provided a method of configuring a software product comprising determining a specific user role, accessing a user model, the user model defining one or more user roles and one or more tasks, each task linked to a role, accessing a task to software function map, the map defining one or more software functions of the software product and one or more tasks, each software function linked to a task, and configuring said software product so that access to said software product according to said specific user role is via a user interface supporting the software functions linked to said specific role via the tasks.

According to another embodiment of the present invention, there is provided a software product comprising a user model, the user model defining one or more user roles and one or more tasks, each task linked to a role, a task to software function map, the map defining one or more software functions of the software product and one or more tasks, each software function linked to a task, and a configuration function arranged to configure said software product so that access to said software product according to a specific user role is via a user interface supporting the software functions linked to said specific role via the tasks According to another embodiment of the present invention, a software product that can be adapted to a wide variety of different organizational structures, and is flexible in its deployment, is provided. The software product can be easily adapted to take into account changes in the organization that take place after the product has been deployed. This invention provides tools to reconfigure the software to match the changing organization structure.

In another embodiment of the present invention a means to reconfigure software products so that the tasks that a product offers are structured to match the roles defined in the new organization is described. This invention describes a software product that configures the user menus (or perspectives in an Eclipse based tool) based on a user model. The configuration is also used to control the types of notifications received by the user role from the software product.

It is possible to model the characteristics of the users that are required to operate a specific software product. This definition shows the tasks they must perform, the skills they require and the concepts (called objects) they will be working with. This model is called a user model. Each software product has its own user model that can be updated to control the user interface.

A separate tool may be provided that allows a user to define for an organization an associated user model. This user model is then pushed down to a number of software products that support this invention. The user model could also provide a structure for security control within a software product (or a suite of software products). The user model could be used as an education advisor based on the role a user has and their declared skill set. A software product (or product suite) could offer a variety of pre-defined user models that can be selected by the organization.

The step of determining a specific user role can comprise receiving an input comprising a user login to the software product, and recalling the specific user role corresponding to said user login. At each user login, their role is determined and this can used to dynamically configure their interface to the software product, based upon the user model and the task to software function map.

The software product can be reconfigured each time the organization changes. Updating of the user model used by the software product and re-configuring of the software product with the updated user model, can be carried out whenever this is needed.

Advantageously, the user model further comprises one or more skill sets, one or more tasks being linked to each skill set, and one or more skill sets being linked to a user role. By using skill sets in the user model, it is easier for an organization to map the user roles to the tasks that the organization is carrying out with regard to the goals of the organization (or the team that is using the software product). An organization can use skill sets to manage organizational analysis and change.

The user model preferably further comprises one or more objects and one or more artifacts, each object defining a concept and linked to at least one task and each artifact defining a physical structure and linked to at least one object. The software product can be arranged to identifying a conflict; the conflict occurring if an artifact is ultimately linked, via object and tasks, to more than one role. The user model could be used to identify conflicts in the use of user artifacts by people and systems, due to the way the work has been divided up.

The user model can include security information, defining access within the software product according to user roles.

This invention can be built as an extension IBM's User Engineering Unified Modeling Language (UE UML) (see http://www.ibm.com/easy). This enables a person to describe a user role with its skills and responsibilities along with user goals, user tasks and user objects. This invention extends the UE UML modeling capabilities by separating the skill definition from the user role definition into a separate modeling artifact. This means skills can be freely associated with multiple user roles and tasks.

BRIEF DESCRIPTION OF THE DRAWINGS

Embodiments of the present invention will now be described, by way of example only, with reference to the accompanying drawings, in which.

It is to be noted, however, that the appended drawings illustrate only example embodiments of the invention, and are therefore not considered limiting of its scope, for the invention may admit to other equally effective embodiments.

DETAILED DESCRIPTION

In the preferred embodiment, an extension of User Engineering UML (UE UML) is utilized to describe a user model. UE UML allows an organization or individual to describe user roles, with attributes of responsibilities and skills. The relationships between the roles show which employee works with which other employee(s). There are also user goals, user tasks and user objects. For more details of this user model, see http://www.ibm.com/easy. In addition to the known components for using in the user model, it is advantageous to add two more stereotypes, firstly, the idea of a skill set (a collection of skills related to one another) and secondly, a user artifact (a special type of user object that is physical, such a pdf file).

Figure 1:
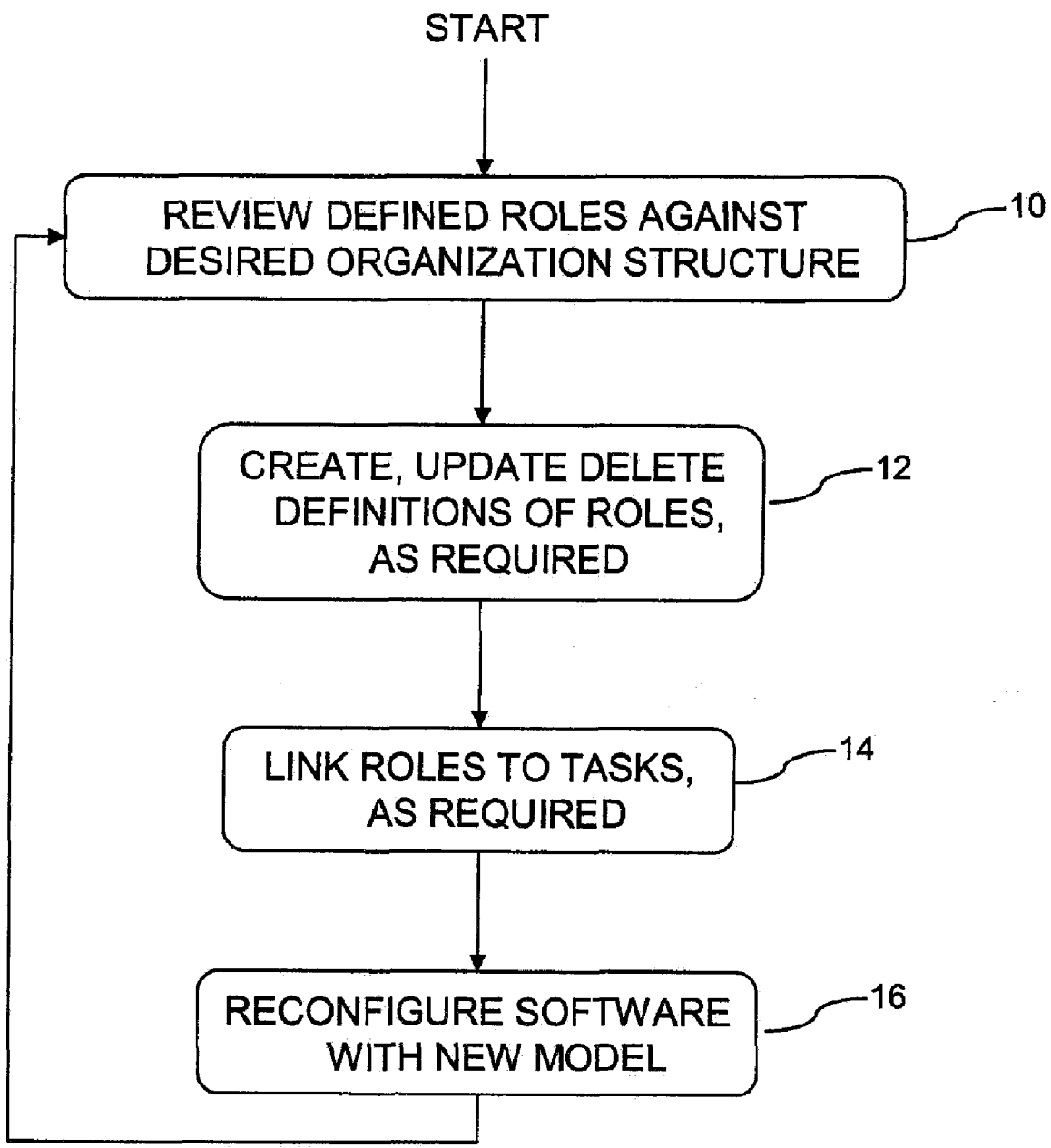
FIG. 1 is a flowchart of a method of creating/updating a user model.

The invention is used to design the roles in the organization and then reconfigure the software. An organization can reconfigure the software each time they wish to update the roles of people in the organization. FIG. 1 illustrates a flow chart, showing the process used, in more detail. The first step 10 is to review the defined roles in the user model against the desired (or existing) organization structure. The user modeling process supports the existence of predefined roles in an organization. For example, if the customer of the software product to be configured is itself a software services company (so that they are purchasing the software product as a tool to provide solutions to their clients) then standard roles such as developer, architect, project manager, etc. will be defined within the user model.

The next step in the process is step 12, which is to adapt the user roles within the user model, to fit the desired organization structure that has been ascertained from step 10. This will involve deleting roles from the user model that do not relate to the business structure of the organization and creating new roles, if the set of roles present does not adequately cover the roles used in the organization. Updating of the existing roles may also occur at this stage, to adapt the pre-defined roles to match as closely as possible the actual structure of the organization that is acquiring the software product.

The next stage is the step 14, which is the linking of the roles to tasks that the organization is going to execute with the software product. The tasks that exist in a user model are predefined by the functionality of the associated software product. The consumer of the software product must decide which roles within their organization match up to which tasks (this will be explained in more detail with reference to FIGS. 2 and 3 below). The flexibility in this approach allows a very high degree of tailoring to meet the actual needs of the organization and maps to the skill sets of their employees.

The final step in the process is step 16, which is the configuration and/or reconfiguration of the software product. From a high level point of view, the process describes a software product that can read the user model and configure the user interface of the software product so that this interface is role-based. The view shown to each role is controlled by the user model. The model can be changed which reconfigures the software product's user interface.

Figure 2:
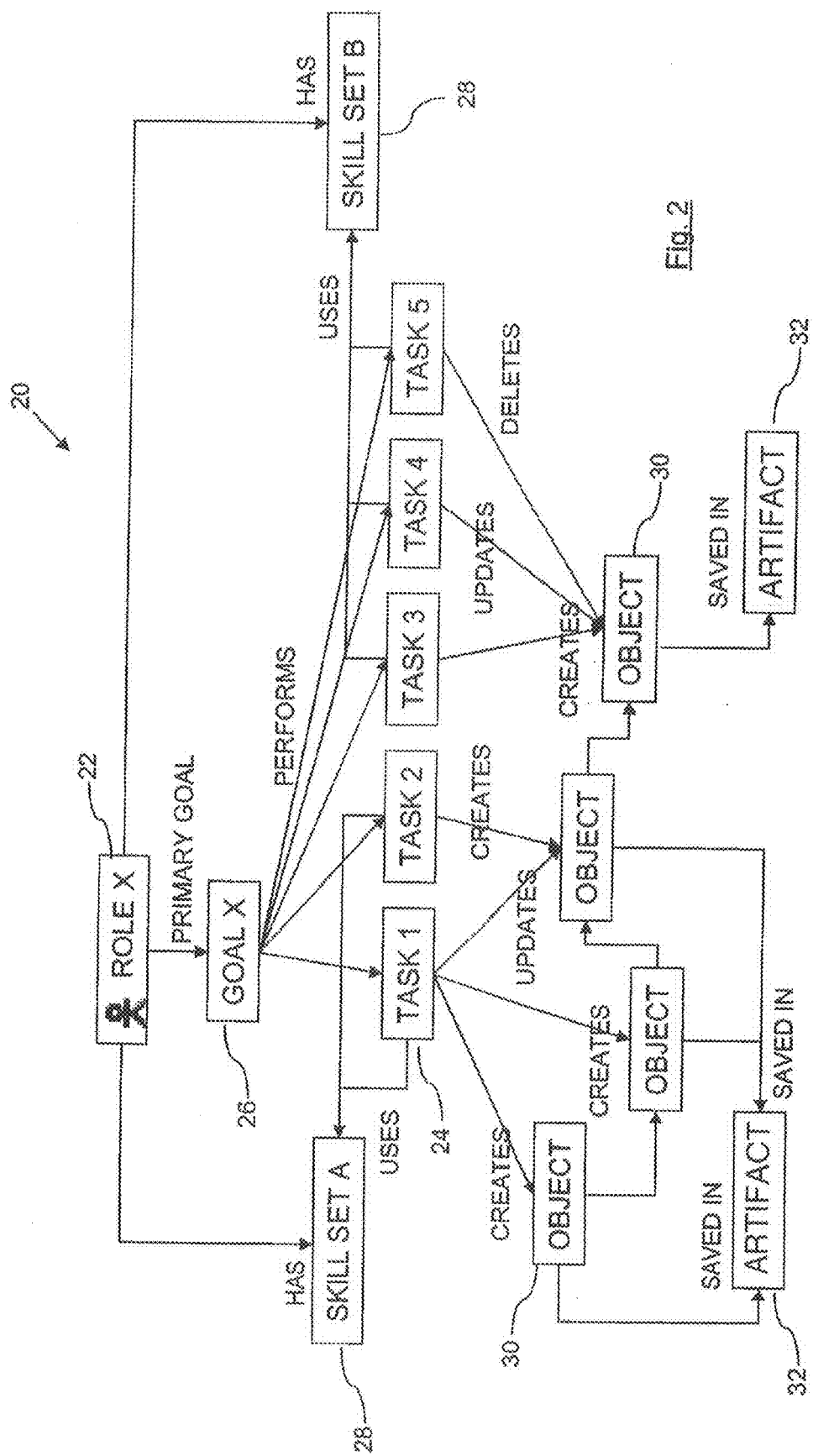
FIG. 2 is a schematic diagram of an example of a user model.

The next two Figures show two examples of a user model. In FIG. 2, the user model 20 defines one or more user roles 22 and one or more tasks 24, each task 24 linked to a role 22. In this example, there is a single role X, which is a highly simplified example of a user model 22 for explanation purposes. In reality, a user model for an average organization may have over one hundred different roles. The role 22 is serving a primary goal 26. The role 22 has (potentially) one to many goals 26, although in this example, only one goal 26 is shown, and the tasks 24 are linked to the goals 26. The tasks 24 linked to a specific goal 26 represent the tasks 24 that need to be completed to satisfy/achieve the respective goal 26.

In the organization that is being modeled in FIG. 2, the specific individual who is filling the role 22 has two skill sets 28, denoted as skill set A and skill set B. The first model (FIG. 2) is for an organization where the software product is going to be used by a single role 22. Notice this role 22 is performing all of the tasks 24 and has two skill sets 28. The tasks 24 map to the functions of the software product and the product is configured (either as a permanent state or dynamically when required) relative to the role 22. This means that when any person who matches the role 22 (which could be more than one person, if there are several people within an organization filling a role who have the same skill sets 28) accesses the software product, then their user interface will be configured to support the functions that map to the tasks 24 that are linked to their role in the user model 20.

Figure 3:
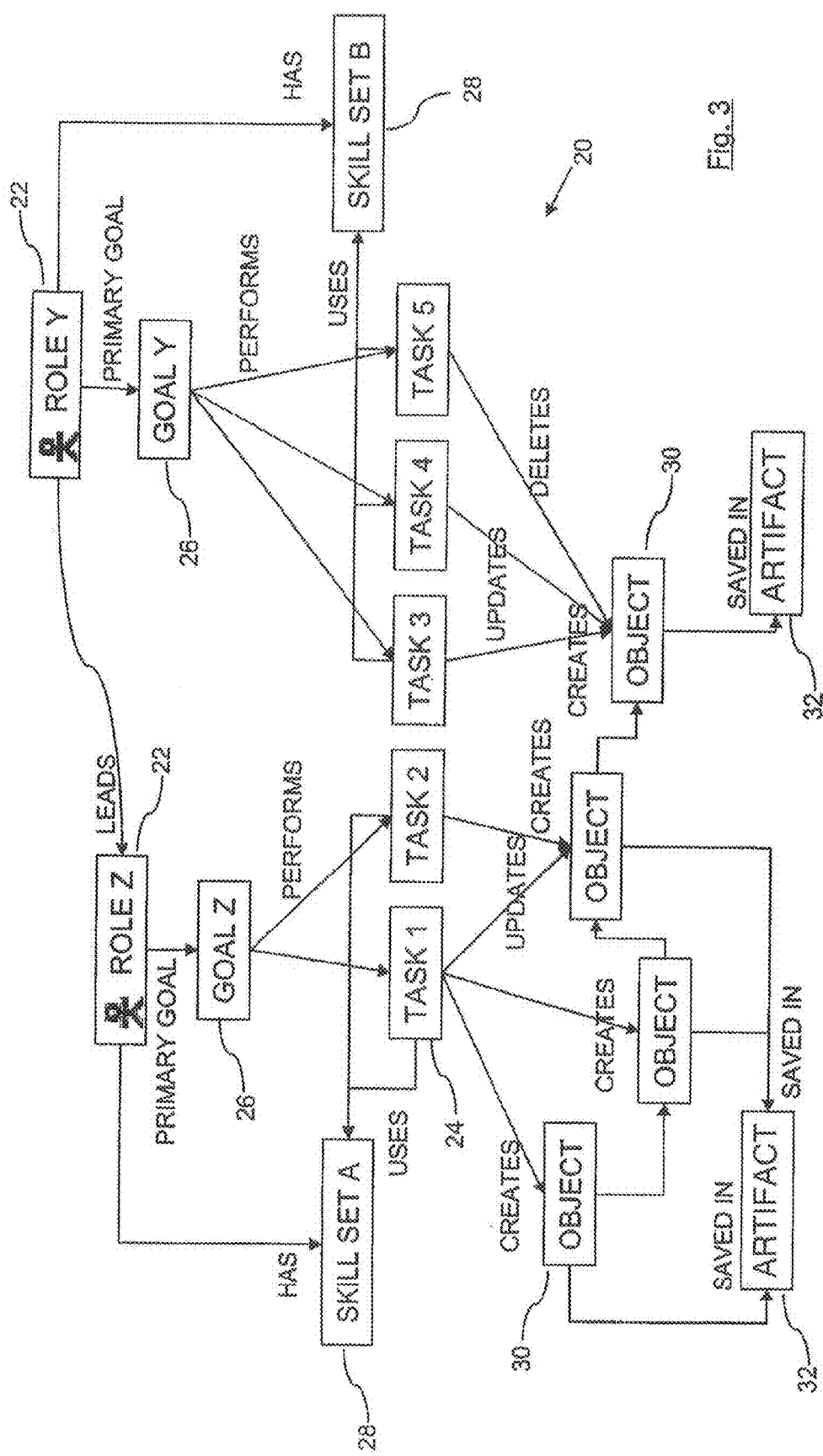
FIG. 3 is a schematic diagram of a second example of a user model.

A second example of the user model 20 is shown in FIG. 3. This second model 20 is for the same organization as before, but now it has split the role 22 into two roles (role Y and role Z). Each role 22 needs one of the skills sets 28 and the tasks 24 are accordingly divided between them. The change between the two user models 20 of FIGS. 2 and 3 could have come about when the original role X is now filled by a different person, or a reorganization of responsibilities may have taken place with the organization that is using the software product.

The tasks 24 that map to the functions of the software product have not changed, but through the medium of the skill sets 28, it can now be seen that the role Z performs only the tasks 1 and 2 in FIG. 3, and role Y performs only the tasks 3, 4 and 5. Once the organization makes a change internally, then a corresponding change to the user model 20 needs to be made to reflect the new structure within the organization. This user model 20 is specific to the particular software product whose tasks are mapped in the model 20.

The net result of the organizational change is a change in the user model 20, and this is used to reconfigure the software product. This reconfiguration is either run in response to the change in the model 20, thereby effecting a permanent change in the software product, or is used when any subsequent access is made to the software product.

For example, a user who corresponds to the new role Z in the model of FIG. 3, when they login to the software product will have their access to the product configured to represent the underlying information stored in the user model 20. The result of the reconfiguration is that the user interface (whether menus or submenus, or options with the functionality etc.) is matched to the tasks that the user is performing, as specified by the user model 20. So the user who has the role Z, will have their interface tailored to the tasks 1 and 2. Similarly the user who logins in to the software product as the role Y, will have their access configured to match tasks 3, 4 and 5 that they have to perform.

The configuration of the user's access does not necessarily bar them from any functionality within the software product. This concept is a design implementation issue. The software product could allow any user, regardless of role, to actually perform other tasks that are not indicated by the user model 20. What the software product does do is optimize the user's access and user interface with regard to the actual tasks that they must perform, as determined by the user model 20.

However it is equally possible that the software product is configured such that access to some functionality is disabled for certain users. This may be because it is perceived that some functionality, perhaps amending security settings, for example, is a task that when not assigned to a specific role, should not be available to anybody who is accessing the software product without the required role.

Although it is not an issue in the example of the change from FIGS. 2 to 3, but the object and artifact part of the user model 20 can be used to determine if the split of tasks 24 between roles 22 is going to cause conflict between different user's access to artifacts 32 (such as a file). This would highlight the need for special locking or configuration management of the artifact 32 to control activities such as simultaneous update.

Figure 4:
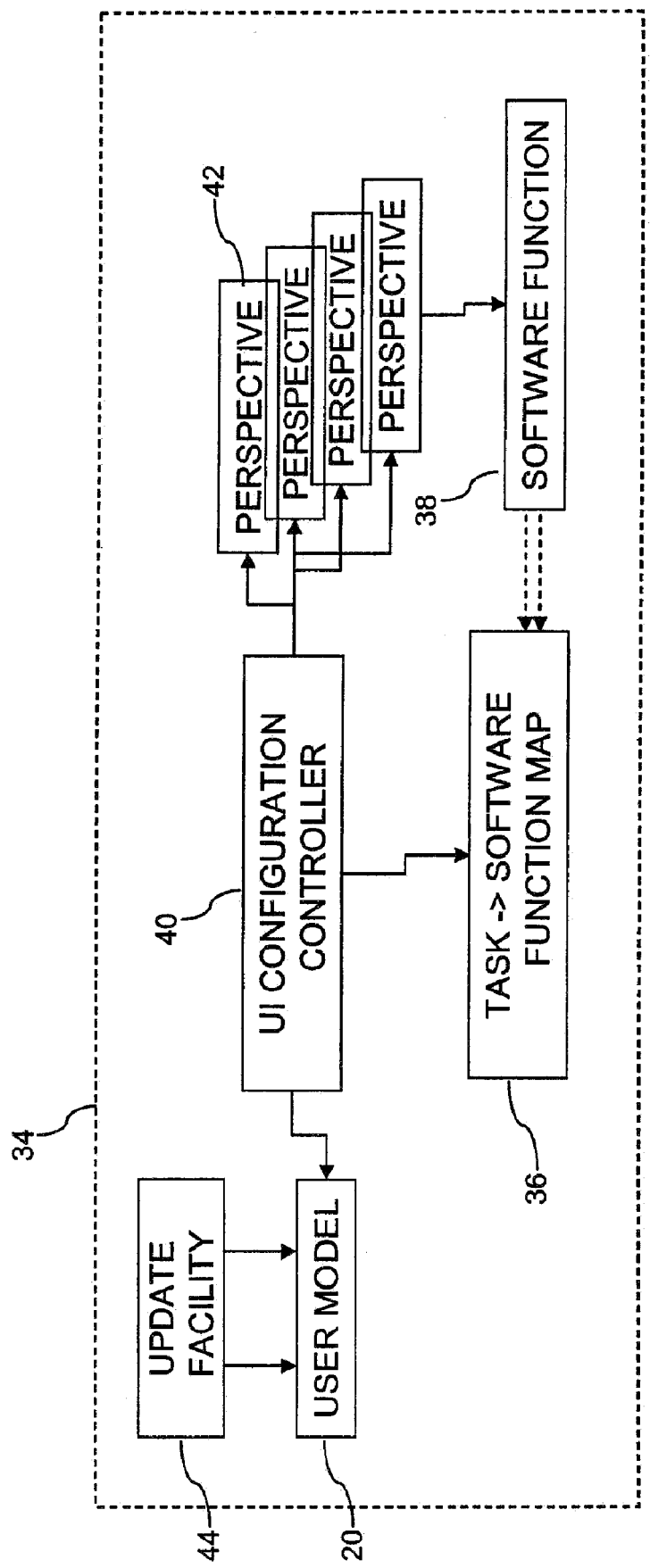
FIG. 4 is a schematic diagram of a software product.

FIG. 4 shows the structure of a software product 34 supporting the invention. The software product 34 comprises the user model 20, the user model defining one or more user roles and one or more tasks, each task linked to a role, as discussed above with reference to FIGS. 2 and 3. In addition, the software product 34 comprises a task to software function map 36, the map 36 defining one or more software functions 38 of the software product 34 and one or more tasks, each software function linked to a task.

The product also includes a configuration function 40 arranged to configure the software product 34 so that access to the software product 34 (according to a specific user role) is via a user interface supporting the software functions 38 linked to the specific role via the tasks. The configuration of the user interface is represented by a number of perspectives 42.

Each software product 34 has a model of the tasks it supports and how that maps to the internal functions. The product 34 can read the user model 20 and automatically configure role-based menus (called perspectives in Eclipse technology). When the user starts the software, they can declare which role they are (or this is auto selected from configuration and/or login details). This sets the particular perspective 42. The model 20 is shown within the software product 34, but it may be a separate entity that is accessed as and when it is needed.

The software product further comprises an update facility 44, which is arranged to update the user model 20. When this happens, the configuration function 40 is arranged to re-configure the software product 34 with the updated user model 20. This reconfiguration and updating of the user model 20 can occur whenever the organization running the software product 34 desires and the resulting updating and reconfiguring occurs automatically.

Figure 5:
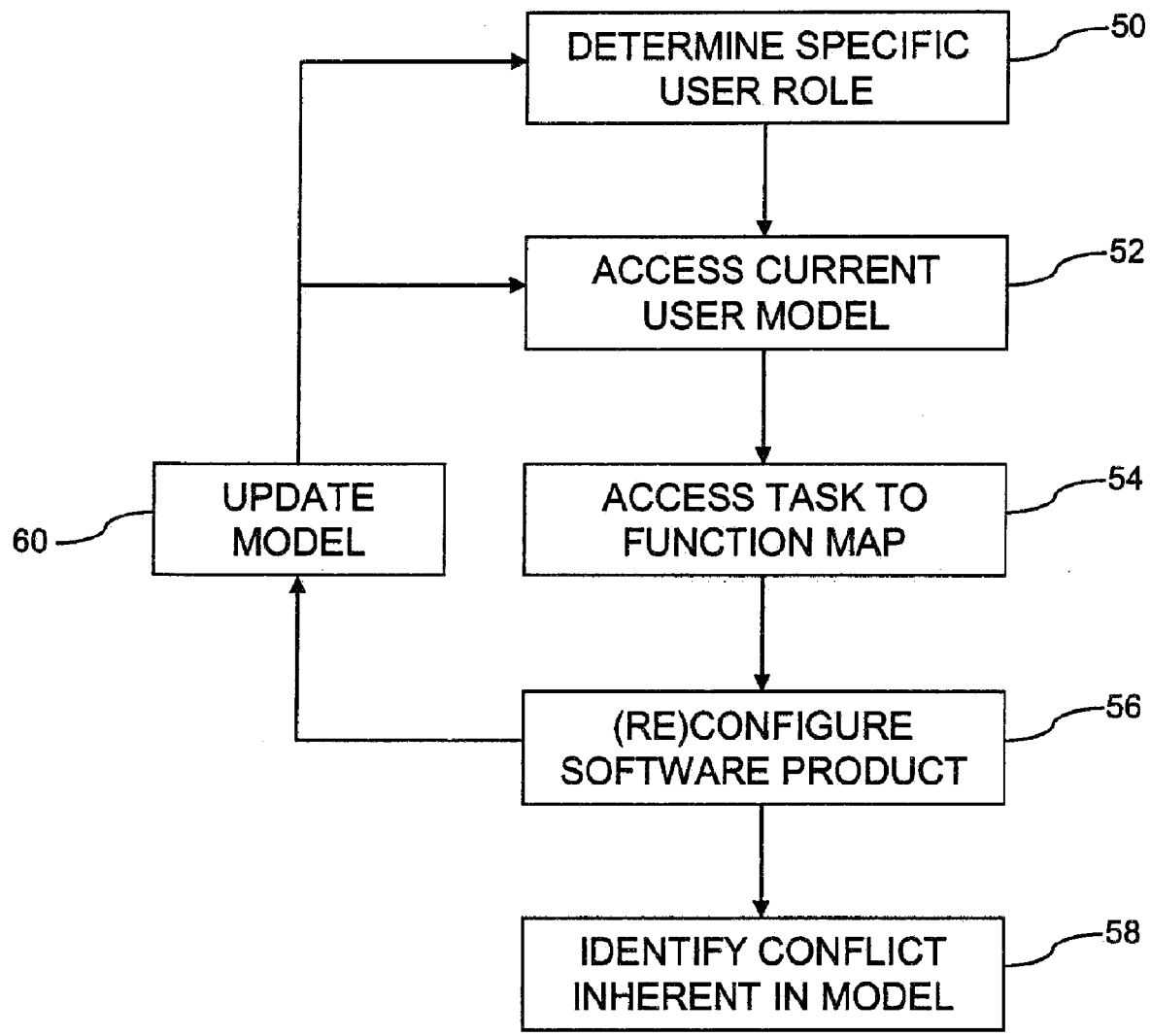
FIG. 5 is a flowchart of a method of configuring a software product.

FIG. 5 shows a flowchart of the method of configuring the software product 34. The method of configuring the software product 34 comprises determining, at the first step 50, a specific user role 22. This can occur when a user logs in to the software product 34, and identifies themselves as having a particular role, or the role is recalled from storage linked to the user's login details.

The next step is the stage 52, which comprises accessing the user model 20. As discussed above, the user model 20 defines one or more user roles 22 and one or more tasks 24, each task 24 linked to a role 22. The user model 20 represents the organization that is using the software product 34 and models the roles and task with respect to that specific product 34. The software product accesses the model 20 to obtain the information about the tasks 24 that match the role 22 that has been determined in step 50.

Following this, the software product 34 accesses the task to software function map 36 (step 54), the map 36 defining one or more software functions 38 of the software product 34 and one or more tasks 24, each software function 38 linked to a task 24. Since the product 34 has determined in the previous step those tasks 24 that will be performed by the role 22 which was determined in the first step of the process, then this step identifies the functions in the map 36 which relate to the specific tasks of interest.

The final primary stage in the configuration method is the step 58, which is configuring of the software product 34 so that access to the software product 34 according to the specific user role 22 is via a user interface supporting the software functions 38 linked to said specific role 22 via the tasks 24. This process is repeatable across any product or product suite as long as the task to software function map 36 is correctly defined for the specific product 34 and the user model 20 is correctly designed for the roles in the target organization.

The method further comprises the step 60 of updating the user model 20 and re-configuring the software product 34 with the updated user model 20. Whenever the model 20 is adapted, then the process can be rerun to organize the reconfiguration of the software product 34.

In addition, the product 34 has the functionality, as a by-product of the configuration process, at step 58 to identify a conflict, the conflict occurring if an artifact is ultimately linked, via object and tasks, to more than one role. The identification of conflict comes from identifying and understanding design patterns that show conflict in the user model or potential conflict in the software product. The data processing system is loaded with these patterns to enable it act as an expert system. An output can be generated that can range from information identifying conflict, through recommendations on how to rectify conflict, to resolving automatically the conflict.

What is claimed is:

1. A method of configuring a software product comprising:
determining a specific user role via a configuration controller;
accessing a user model via the configuration controller, the user model defining one or more user roles and one or more tasks, each task linked to a role, the user model comprising one or more objects and one or more artifacts, each object defining a concept and linked to at least one task and each artifact defining a physical structure and linked to at least one object;
accessing a task to software function map via the configuration controller, the map defining one or more software functions of the software product and one or more tasks, each software function linked to a task;
configuring the software product via the configuration controller, so that access to the software product according to the specific user role is via a user interface supporting the software functions linked to the specific role via the tasks;
updating the user model via an update facility, and;
re-configuring said software product with the updated user model via the configuration controller.

2. A method according to claim 1, wherein the user model further comprises one or more skill sets, one or more tasks being linked to each skill set, and one or more skill sets being linked to a user role.

3. A method according to claim 1, further comprising:
identifying a conflict via the configuration controller, the conflict occurring if an artifact is ultimately linked, via object and tasks, to more than one role.

4. A method according to claim 1, wherein the user model includes security information, defining access within the software product according to user roles.

5. A method according to claim 1, wherein determining a specific user role comprises receiving an input comprising a user login to the software product, and recalling the specific user role corresponding to said user login.

6. A method according to claim 1, wherein the user model further comprises one or more goals, each goal being linked to a role, and one or more tasks being linked to each goal.

7. A computer program product for configuring a software product, the computer program product comprising:
a computer readable storage medium having computer readable program code embodied therewith, the computer readable program code configured to:
access a user model via a configuration manager, the user model defining one or more user roles and one or more tasks, each task linked to a role, wherein the user model further comprises one or more objects and one or more artifacts, each object defining a concept and linked to at least one task and each artifact defining a physical structure and linked to at least one object,
access a task to a software function map via the configuration controller, the map defining one or more software functions of the software product and one or more tasks, each software function linked to a task,
configure said software product via the configuration controller so that access to said software product according to a specific user role is via a user interface supporting the software functions linked to said specific role via the tasks;
update the user model via an update facility, and;
re-configure said software product with the updated user model via the configuration controller.

8. The computer program product according to claim 7, wherein the user model further comprises one or more skill sets, one or more tasks being linked to each skill set, and one or more skill sets being linked to a user role.

9. The computer program product according to claim 7, wherein the computer readable program code is further configured to:
identify a conflict via the configuration controller, the conflict occurring if an artifact is ultimately linked, via object and tasks, to more than one role.

10. The computer program product according to claim 7, wherein the user model includes security information, defining access within the software product according to user roles.

11. The computer program product according to claim 7, wherein the computer readable program code is further configured to:
determine the specific user role via the configuration controller following receipt of an input comprising a user login to the software product, by recalling the specific user role corresponding to the user login.

12. The computer program product according to claim 7, wherein the user model further comprises one or more goals, each goal being linked to a role, and one or more tasks being linked to each goal.

* * * * *